(12) United States Patent
Kessler et al.

(10) Patent No.: US 10,935,433 B2
(45) Date of Patent: Mar. 2, 2021

(54) FOOD PROBE FOR DETERMINING THE TEMPERATURE IN THE INTERIOR OF FOOD STUFF

(71) Applicant: ELECTROLUX APPLIANCES AKTIEBOLAG, Stockholm (SE)

(72) Inventors: Martin Kessler, Rothenberg ob der Tauber (DE); Eric Bosscher, Rothenburg ob der Tauber (DE); Fabienne Reinhard-Herrscher, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 343 days.

(21) Appl. No.: 16/060,200

(22) PCT Filed: Oct. 14, 2016

(86) PCT No.: PCT/EP2016/074663
§ 371 (c)(1),
(2) Date: Jun. 7, 2018

(87) PCT Pub. No.: WO2017/108224
PCT Pub. Date: Jun. 29, 2017

(65) Prior Publication Data
US 2018/0364107 A1    Dec. 20, 2018

(30) Foreign Application Priority Data
Dec. 22, 2015 (EP) ................................ 15201804

(51) Int. Cl.
*G01K 7/16* (2006.01)
*G01K 1/02* (2021.01)
*G01K 13/00* (2021.01)

(52) U.S. Cl.
CPC .............. *G01K 1/026* (2013.01); *G01K 7/16* (2013.01); *G01K 13/00* (2013.01); *G01K 2207/06* (2013.01)

(58) Field of Classification Search
CPC .. G01K 1/16; G01K 1/08; G01K 7/16; G01K 1/14; G01N 27/904
(Continued)

(56) References Cited

U.S. PATENT DOCUMENTS 3,931,620 A * 1/1976 Wellman, Jr. ............. F24C 7/08
340/599
3,991,615 A * 11/1976 Hornung .................. G01K 1/08
338/28

(Continued)

FOREIGN PATENT DOCUMENTS

DE    102012222154 A1    6/2014
EP    1927810 A1         6/2008
WO    9316333 A1         8/1993

OTHER PUBLICATIONS

International Search Report & Written Opinion issued in corresponding application No. PCT/EP2016/074663 dated Nov. 16, 2016, 11 pages.

*Primary Examiner* — Gail Kaplan Verbitsky
(74) *Attorney, Agent, or Firm* — Pearne & Gordon LLP

(57) ABSTRACT

The present invention relates to a food probe (10) for determining the temperature or the temperatures in the interior of food stuff. The food probe (10) comprises an elongated rod (12). A front portion of the rod (12) is provided for penetrating the food stuff. The rod (12) is subdivided into at least three pipe sections (16, 18, 20) arranged serially. The rod (12) includes a cone end (22) arranged at its front end. The food probe (10) comprises at least three temperature sensors (32, 34, 36). A most one of the temperature sensors (32, 34, 36) is arranged inside one (Continued)

Figure 1:
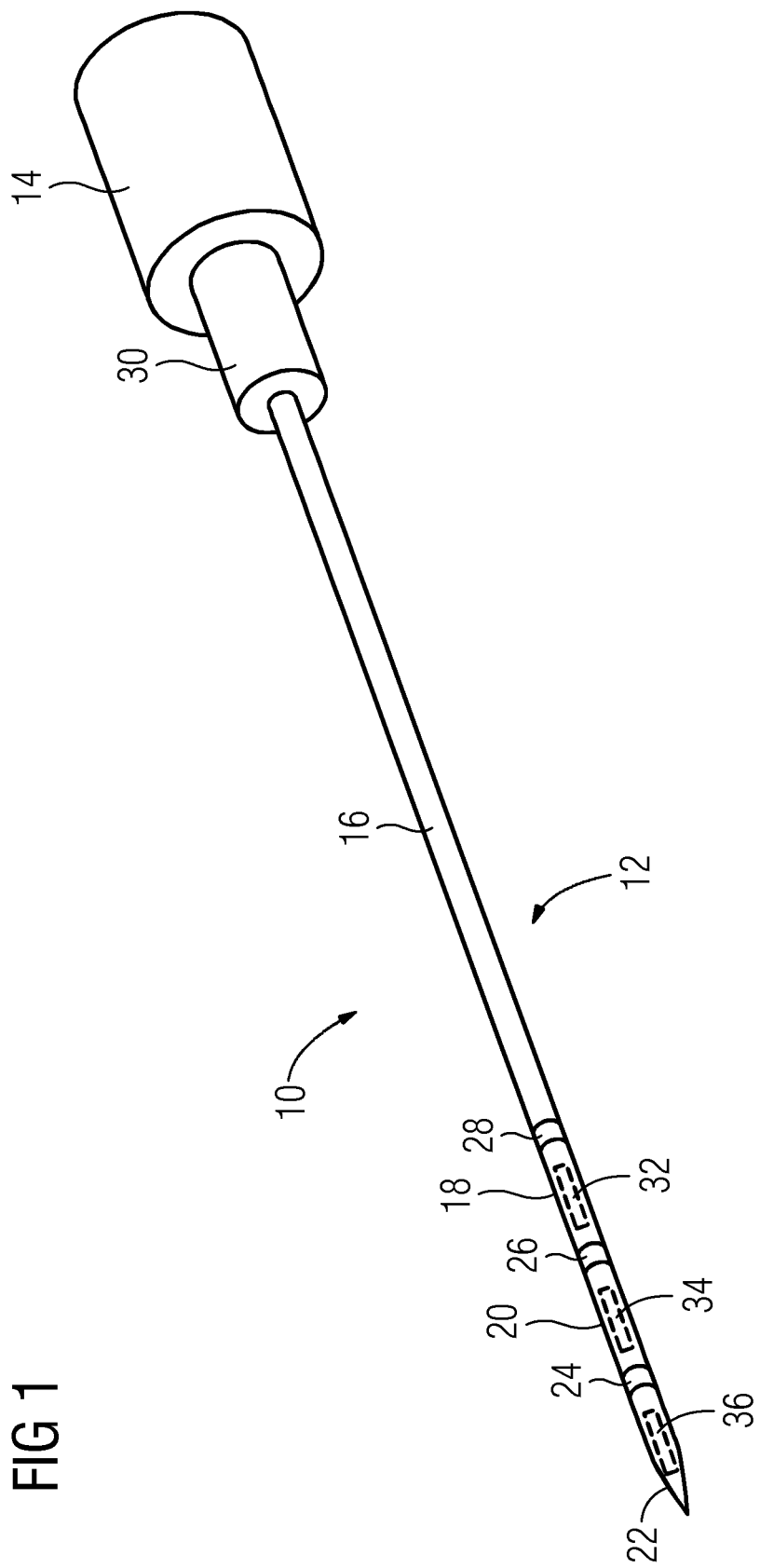

pipe section (18, 20) and/or inside the cone end (22). The food probe (10) comprises a connector (38, 40, 42) provided for an electric connection to a control unit. The connector comprises at least three connector elements (38, 40, 42) connected to the temperature sensors (32, 34, 36) according to the predetermined scheme. Further, the present invention relates to a method for controlling a cooking process.

15 Claims, 2 Drawing Sheets

(58) Field of Classification Search
USPC ........ 374/137, 163, 185, 208, 100, 110, 179
See application file for complete search history.

(56) References Cited

U.S. PATENT DOCUMENTS

| | | | | |
|---|---|---|---|---|
| 5,167,153 | A * | 12/1992 | McQueen | G01F 1/684 338/22 R |
| 5,685,641 | A * | 11/1997 | Ribi | G01K 1/16 116/217 |
| 5,719,332 | A * | 2/1998 | Wallrafen | G01F 23/247 340/622 |
| 6,066,839 | A * | 5/2000 | Park | H05B 6/6455 219/710 |
| 7,258,483 | B2 * | 8/2007 | Heldberg | G01F 23/246 374/110 |
| 8,609,168 | B2 * | 12/2013 | Ceravalls Pujol | G01K 1/14 426/231 |
| 2002/0122459 | A1 * | 9/2002 | McFarland | G01K 13/02 374/179 |
| 2003/0165181 | A1 * | 9/2003 | Gul | G01K 3/06 374/185 |
| 2004/0114665 | A1 * | 6/2004 | Park | G01K 1/026 374/179 |
| 2008/0043809 | A1 * | 2/2008 | Herbert | G01K 1/026 374/163 |
| 2010/0021606 | A1 * | 1/2010 | Rauh | F24C 7/08 426/523 |
| 2014/0044841 | A1 * | 2/2014 | Luckhardt | A23L 3/16 426/233 |
| 2014/0086274 | A1 * | 3/2014 | Henke | G01K 1/026 374/142 |
| 2014/0341254 | A1 * | 11/2014 | Mendez | G01K 3/06 374/137 |
| 2015/0173129 | A1 * | 6/2015 | Tils | G01K 1/026 374/1 |

* cited by examiner

FOOD PROBE FOR DETERMINING THE TEMPERATURE IN THE INTERIOR OF FOOD STUFF

The present invention relates to a food probe for determining the temperature or the temperatures in the interior of food stuff. Further, the present invention relates to a method for controlling a cooking process.

A food probe for determining the temperature in the interior of food stuff includes an elongated rod, wherein one or more temperature sensors are arranged inside a front end portion of said elongated rod. When the elongated rod of the food probe penetrates the food stuff, then the temperature in the interior of said food stuff may be detected.

However, it is difficult for the user to operate the food probe in such a way that the temperature sensor is positioned in the centre of the food stuff. In the most cooking procedures the most relevant temperature of the food stuff is in its centre.

It is an object of the present invention to provide a food probe for determining the temperature in the interior of food stuff, wherein the detection of the temperature in the centre of the food stuff is facilitated.

The present invention relates to a food probe for determining the temperature or the temperatures in the interior of food stuff, wherein
- the food probe comprises an elongated rod,
- a front portion of the rod is provided for penetrating the food stuff,
- the rod is subdivided into at least three pipe sections arranged serially,
- the rod includes a cone end arranged at its front end,
- the food probe comprises at least three temperature sensors,
- at most one of the temperature sensors is arranged inside one pipe section and/or inside the cone end,
- the food probe comprises a connector provided for an electric connection to a control unit, and
- the connector comprises at least three connector elements connected to the temperature sensors according to the predetermined scheme.

The three or more temperature sensors of the food probe increase the probability that one temperature sensor is placed close to the centre of the food stuff, when the food probe is inserted into the food stuff by the user. Usually, the centre of the food stuff is the coldest location. For example, a three-pole connector is sufficient for carrying information of the three temperature sensors. In general, the number of the connector elements or poles of the connector corresponds with the number of the temperature sensors. The connector elements and the temperature sensors form a network by low complexity inside the food probe. The food probe does not require any active electronic devices. The food probe provides three or more temperature values by low complexity.

Preferably, the pipe sections and/or the cone end are separated by thermal insulating elements. Said thermal insulating elements prevent that thermal energy from the oven cavity increases the detected temperature.

Further, the food probe may comprise a handle arranged at a rear end of the rod.

For example, the connector is arranged in or at the handle.

Alternatively, the food probe comprises a cable electrically interconnecting the handle at its one end and the connector at its other end.

In particular, the pipe sections and/or the cone end are made of heat conductive material or materials, in particular the pipe sections and/or the cone end are made of metal. This contributes to the accuracy of the temperature detection.

Preferably, the thermal insulating elements are made of silicone or of a material including silicone.

According to one example, the temperature sensor includes two terminals, wherein the one terminal of each temperature sensor is connected to the corresponding connector element in each case, while the other terminals of each temperature sensor are interconnected to each other.

According to another example, the temperature sensor includes two terminals, wherein a first temperature sensor is connected in parallel to a series including a second temperature sensor and a third temperature sensor, wherein the first temperature sensor and said series are interconnected between a first connector element and a third connector element, while the crosspoint of the second temperature sensor and the third temperature sensor is connected to a second connector element. In this case, a diode is connected upstream the second temperature sensor.

According to a preferred embodiment, the temperature sensors are arranged inside short pipe sections and/or inside the cone end in a front portion of the rod, while a long pipe section forms a rear portion of the rod.

Further, the present invention relates to a method for controlling a cooking process, wherein the method comprises the steps of:
a) setting a temperature value for a core of a food stuff,
b) starting the cooking process,
c) detecting at least three temperatures at different positions in the interior of the food stuff,
d) comparing the lowest value of the detected temperatures with the set temperature value,
e) determining the residual time of the cooking process, and
f) finishing the cooking process, if the residual time has been expired.

Preferably, the steps b), c) and d) are repeated after a predetermined time. Thus, the residual time of the cooking process may be updated during the cooking process.

Further, the heating elements may be switched off before the end of the cooking process, when the residual time of said cooking process has fallen below a predetermined value. The residual heat of the heating elements may be used, so that energy is saved.

At last, the method is performed by using at least one food probe as mentioned above.

Novel and inventive features of the present invention are set forth in the appended claims.

Figure 2:
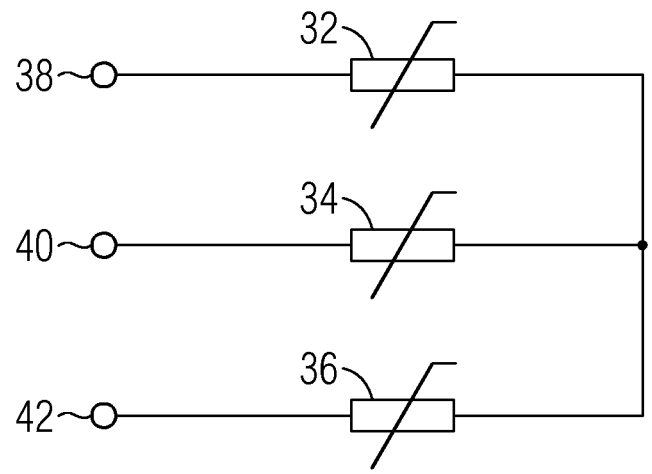
Figure 3:
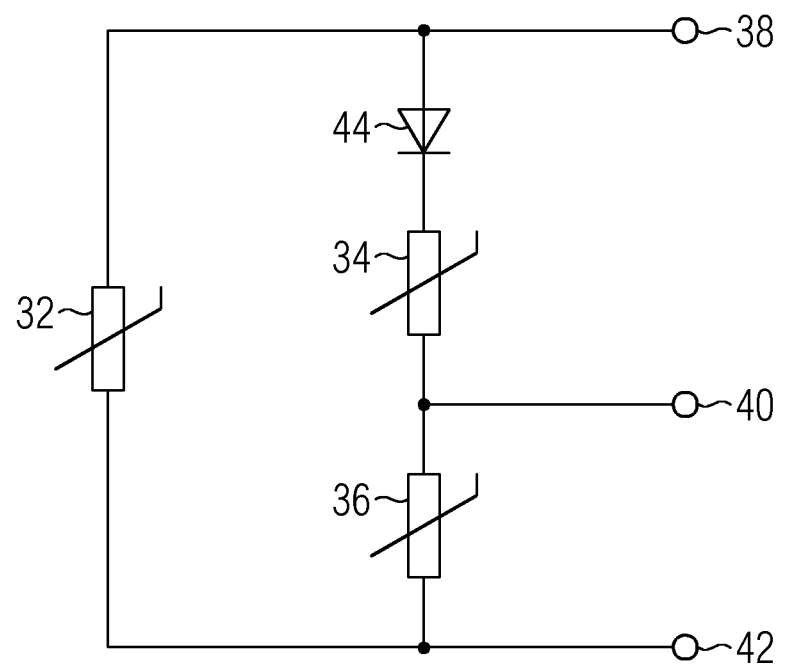

The present invention will be described in further detail with reference to the drawing, in which FIG. 1 illustrates a schematic perspective view of a food probe according to a preferred embodiment of the present invention, FIG. 2 illustrates a first example of a schematic circuit diagram of three temperature sensors for the food probe according to the preferred embodiment of the present invention, and FIG. 3 illustrates a second example of the schematic circuit diagram of the three temperature sensors for the food probe according to the preferred embodiment of the present invention.

FIG. 1 illustrates a schematic perspective view of a food probe 10 according to a preferred embodiment of the present invention. The food probe 10 is provided for penetrating in the interior of food stuff during a cooking process.

The food probe 10 comprises an elongated rod 12 and a handle 14. The handle 14 is arranged at a rear end of the rod 12. The rod 12 includes a long pipe section 16, a first short pipe section 18, a second short pipe section 20 and a cone end 22. Further, the rod 12 includes four thermal insulating elements 24, 26, 28 and 30. The long pipe section 16, the first short pipe section 18, the second short pipe section 20 and the cone end 22 are serially arranged. In this example, the long pipe section 16, the first short pipe section 18 and the second short pipe section 20 have the same diameters.

The cone end 22 is arranged at a front end of the rod 12. The second short pipe section 20 is arranged besides the cone end 20, wherein a first thermal insulating element 24 is placed between them. The first short pipe section 18 is arranged besides the second short pipe section 20, wherein a second thermal insulating element 26 is placed between them. The long pipe section 12 is arranged between the first short pipe section 18 and the handle 14. A third thermal insulating element 28 is placed between the first short pipe section 18 and the long pipe section 16, while a fourth thermal insulating element 30 is placed between the long pipe section 12 and the handle 14.

A first temperature sensor 32 is arranged inside the first short pipe section 18. In a similar way, a second temperature sensor 34 is arranged inside the second short pipe section 20. At last, a third temperature sensor 36 is arranged inside the cone end 22. In particular, the temperature sensors 32, 34 and 36 are passive electric or electronic devices. In this example, the temperature sensors 32, 34 and 36 are temperature-dependent resistors. The temperature sensors 32, 34 and 36 are electrically interconnected according to a predetermined scheme. Further, the temperature sensors 32, 34 and 36 are electrically connected to a connector, wherein said connector is preferably arranged in or at the handle 14. The connector is provided for an electrical cable connection to a control unit. Alternatively, an electrical cable is permanently connected to the handle 14 and provided for a direct connection to the control unit.

The long pipe section 16, the first short pipe section 18, the second short pipe section 20 and the cone end 22 are made of heat conductive materials. In this example, the long pipe section 16, the first short pipe section 18, the second short pipe section 20 and the cone end 22 are made of metal. The thermal insulating elements 24, 26, 28 and 30 are preferably made of silicone or a material including silicone. The thermal insulating elements 24, 26, 28 and 30 prevent that thermal energy from the oven cavity increases the detected temperature.

The food probe 10 is provided for penetrating in the interior of food stuff. Since the food probe 10 includes three temperature sensors 32, 34 and 36 at different positions, the temperatures may be determined at three different positions inside the food stuff.

FIG. 2 illustrates a first example of a schematic circuit diagram of three temperature sensors 32, 34 and 36 for the food probe 10 according to the preferred embodiment of the present invention.

In the first example the one terminal of each temperature sensor 32, 34 and 36 is connected to a corresponding connector element 38, 40 and 42, respectively, while the other terminals of each temperature sensor 32, 34 and 36 are interconnected to each other. The one terminal of the first temperature sensor 32 is connected to a first connector element 38. In a similar way, the one terminal of the second temperature sensor 32 is connected to a second connector element 40. At last, the one terminal of the third temperature sensor 36 is connected to a third connector element 42. In this example, the temperature sensors 32, 34 and 36 are temperature-dependent resistor elements. In particular, the temperature sensors 32, 34 and 36 are positive temperature coefficient (PTC) resistor elements. Alternatively, the temperature sensors 32, 34 and 36 are negative temperature coefficient (NTC) resistor elements. Preferably, the temperature sensors 32, 34 and 36 are positive temperature coefficient (PTC) resistor elements, wherein the resistance is proportional to the temperature at least within the relevant temperature range.

The connector elements 38, 40 and 42 form the connector arranged in or at the handle 14 of the food probe 10. The connector is provided for an electrical cable connection to a control unit. The three connector elements 38, 40 and 42 are appropriate to provide sufficient values for determining the three temperatures at the temperature sensor 32, 34 and 36. Only three electrical connections between the connector elements 38, 40 and 42 on the one hand and the control unit on the other hand are sufficient for the transfer of the complete information detected by the temperature sensor 32, 34 and 36 to said control unit.

The relationship of a resistance R12 between the first connector element 38 and the second connector element 40 on the one hand and the resistance R1 of the first temperature sensor 32 and the resistance R2 of the second temperature sensor 34 on the other hand is given by:

$$R12=R1+R2 \quad (1)$$

In a similar way, the relationship of the resistance R13 between the first connector element 38 and the third connector element 42 on the one hand and the resistance R1 of the first temperature sensor 32 and the resistance R3 of the third temperature sensor 36 on the other hand is given by:

$$R13=R1+R3 \quad (2)$$

At last, the relationship of the resistance R23 between the second connector element 40 and the third connector element 42 on the one hand and the resistance R2 of the second temperature sensor 34 and the resistance R3 of the third temperature sensor 36 on the other hand is given by:

$$R23=R2+R3 \quad (3)$$

The resistances R12, R13 and R23 between two of the connector elements 38, 40 and 42, respectively, are directly detected by the control unit, while the resistances R1, R2 and R3 of the temperature sensors 32, 34 and 36 are calculated from said resistances R12, R13 and R23 by a micro controller of the control unit.

The equations (1), (2) and (3) mentioned above result in the conditional equations for calculated resistances RI, RII and RIII of the temperature sensors 32, 34 and 36:

$$RI=(R12+R13-R23)/2 \quad (4)$$

$$RII=(R12+R23-R13)/2 \quad (5)$$

$$RIII=(R13+R23-R12)/2 \quad (6)$$

Thus, three electrical connections between the food probe 10 and the control unit are sufficient for calculating the current resistances RI, RII and RIII of the temperature sensors 32, 34 and 36 and consequently for the detection of the temperatures at three different positions inside the food stuff.

FIG. 3 illustrates a second example of the schematic circuit diagram of the three temperature sensors 32, 34 and 36 for the food probe 10 according to the preferred embodiment of the present invention. In addition to the three temperature sensors 32, 34 and 36 the circuit of the second example comprises a diode 44.

The diode 44, the second temperature sensor 34 and the third temperature sensor 36 are connected in series. The first temperature sensor 32 is connected in parallel to said series. The first temperature sensor 32 on the one hand and the series mentioned above on the other hand are interconnected between the first connector element 38 and the third connector element 42.

The second connector element 40 is connected to the crosspoint of the second temperature sensor 34 and the third temperature sensor 36.

The connector elements 38, 40 and 42 form the connector arranged in or at the handle 14 of the food probe 10. The connector is provided for an electrical cable connection to a control unit. The three connector elements 38, 40 and 42 are appropriate to provide sufficient values for determining the three temperatures at the temperature sensor 32, 34 and 36.

The food probe 10 allows the detection of three temperatures at three different positions inside the food stuff. The food probe 10 may be provided for a method for controlling the cooking process. The lowest detected temperature value and a temperature value set by the user are compared for determining the residual time of the cooking process and/or the doneness of the food stuff. The cooking time and doneness can only indirectly be controlled by the user. The user sets the temperature value in the oven cavity and the temperature in the core of the food stuff, while the cooking time is determined by detecting the at least three temperatures inside the food stuff and comparing the lowest of those temperatures with the temperature value set be the user.

Further, the determination of the residual time of the cooking process allows that the heating elements are switched off a predetermined time before the cooking process will end. This method saves energy. Further, the point in time of finishing the cooking process may be delayed, if it is required.

The food probe 10 of the present invention does not require any active electronic device. The food probe 10 is realized by small costs and by low complexity.

Although an illustrative embodiment of the present invention has been described herein with reference to the accompanying drawing, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims

LIST OF REFERENCE NUMERALS

10 food probe
12 rod
14 handle
16 long pipe section
18 first short pipe section
20 second short pipe section
22 cone end
24 first thermal insulating element
26 second thermal insulating element
28 third thermal insulating element
30 fourth thermal insulating element
32 first temperature sensor
34 second temperature sensor
36 third temperature sensor
38 first connector element
40 second connector element
42 third connector element
44 diode
R1 resistance of the first temperature sensor
R2 resistance of the second temperature sensor
R3 resistance of the third temperature sensor
R12 resistance between the first and second connector element
R13 resistance between the first and third connector element
R23 resistance between the second and third connector element
RI calculated resistance of the first temperature sensor
RII calculated resistance of the second temperature sensor
RIII calculated resistance of the third temperature sensor

The invention claimed is:

1. A food probe for determining temperatures in the interior of food stuff, comprising;
    an elongated rod,
    a front portion of the rod provided for penetrating the food stuff,
    the rod being subdivided into at least three pipe sections arranged serially,
    the rod including a cone end arranged at its front end,
    at least three temperature sensors,
    at most one of the temperature sensors being arranged inside one pipe section and/or inside the cone end,
    a connector provided for an electric connection to a control unit,
    the connector comprising at least three connector elements connected to the temperature sensors according to a predetermined scheme,
    wherein each said temperature sensor includes two terminals, wherein a first said temperature sensor is connected in parallel to a series including a said second temperature sensor and a third said temperature sensor, and
    the first temperature sensor and said series are interconnected between a first connector element and a third connector element, while a crosspoint of the second temperature sensor and the third temperature sensor is connected to a second connector element.

2. The food probe according to claim 1, wherein the pipe sections and/or the cone end are separated by thermal insulating elements.

3. The food probe according to claim 1, further comprising a handle arranged at a rear end of the rod.

4. The food probe according to claim 3, wherein the connector is arranged in or at the handle.

5. The food probe according to claim 3, further comprising an electrical cable interconnecting the handle at its one end and the connector at its other end.

6. The food probe according to claim 1, wherein the pipe sections and/or the cone end are made of heat conductive material or materials.

7. The food probe according to claim 2, wherein the thermal insulating elements are made of silicone or of a material including silicone.

8. The food probe according to claim 1, wherein a diode is connected upstream of the second temperature sensor.

9. The food probe according to claim 1, wherein the temperature sensors are arranged inside short pipe sections and/or inside the cone end in a front portion of the rod, while a long pipe section forms a rear portion of the rod.

10. A method for controlling a cooking process, comprising the steps of:
    a) setting a temperature value for a core of a food stuff,
    b) starting the cooking process by switching on heating elements of a cooking appliance, c) detecting at least three temperatures at different positions in an interior of the food stuff with the food probe according to claim 1, d) comparing the lowest value of the detected temperatures with a set temperature value, e) determining a residual time of the cooking process, and f) finishing the cooking process if the residual time has been expired.

11. The method according to claim 10, wherein the steps b), c) and d) are repeated after a predetermined time.

12. The method according to claim 10, wherein the heating elements are switched off before the end of the cooking process when the residual time of said cooking process has fallen below a predetermined value.

13. The method according to claim 10, wherein said step c) is carried out using the food probe according to claim 1.

14. A food probe comprising an elongated rod having a first pipe section, a second pipe section and a cone end all made of heat conductive material and arranged serially, a plurality of thermal insulating elements interposed between said first and second pipe sections and said cone end, respectively, a first temperature sensor disposed within said first pipe section, a second temperature sensor disposed within said second pipe section, and a third temperature sensor disposed within said cone end, all of said temperature sensors comprising temperature-dependent resistors and having respective first and second terminals, wherein a first said temperature sensor is connected in parallel to a series including a said second temperature sensor and a third said temperature sensor, and the first temperature sensor and said series are interconnected between a first connector element and a third connector element, while a crosspoint of the second temperature sensor and the third temperature sensor is connected to a second connector element, wherein the connector elements provide information from said temperature sensors to a control unit configured to control a cooking process, wherein said information from said three connector elements is sufficient to calculate current resistances of each of the respective first, second and third temperature sensors, to thereby independently detect three different temperatures within a foodstuff encountered by each of the respective temperature sensors.

15. The food probe according to claim 14, a diode being located upstream of said second temperature sensor in-line between both said first connector element and said first temperature sensor on the one hand and said second temperature sensor on the other hand.

* * * * *